(12) United States Patent
Smith et al.

(10) Patent No.: US 9,329,874 B2
(45) Date of Patent: May 3, 2016

(54) STRING CUSTOMIZATION

(75) Inventors: Michael V. Smith, Fremont, CA (US); George K. Nyako, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1777 days.

(21) Appl. No.: 11/821,189

(22) Filed: Jun. 22, 2007

(65) Prior Publication Data

US 2008/0320400 A1    Dec. 25, 2008

(51) Int. Cl.
| | |
|---|---|
| G06F 9/44 | (2006.01) |
| G06F 3/0484 | (2013.01) |
| G06F 3/0481 | (2013.01) |
| G06F 3/0482 | (2013.01) |
| G06F 3/0488 | (2013.01) |

(52) U.S. Cl.
CPC ............ G06F 9/4448 (2013.01); G06F 3/0481 (2013.01); G06F 3/0482 (2013.01); G06F 3/0484 (2013.01); G06F 3/0488 (2013.01); G06F 3/04817 (2013.01); G06F 3/04842 (2013.01); G06F 8/38 (2013.01); G06F 9/4443 (2013.01)

(58) Field of Classification Search
CPC . G06F 3/0481; G06F 3/0482; G06F 3/04842; G06F 3/0488; G06F 3/04817; G06F 3/0484; G06F 9/4448; G06F 8/38; G06F 9/4443

USPC ........................ 715/762, 703, 810; 725/37, 39
See application file for complete search history.

(56) References Cited

U.S. PATENT DOCUMENTS

| | | | |
|---|---|---|---|
| 6,920,607 | B1 | 7/2005 | Ali et al. |
| 6,989,770 | B1 | 1/2006 | Painter |
| 7,146,578 | B2 | 12/2006 | Kim |
| 2002/0152244 | A1 | 10/2002 | Dean et al. |
| 2004/0056894 | A1* | 3/2004 | Zaika et al. .................... 345/762 |

(Continued)

OTHER PUBLICATIONS

Cheng Tao, "XUL—Creating Localizable XML GUI", Date: Aug./Sep. 1999, pp. 1-22, 15th International Unicode Conference, San Jose, CA.

(Continued)

*Primary Examiner* — Tuyetlien T Tran
(74) *Attorney, Agent, or Firm* — Aaron Chatterjee; Judy Yee; Micky Minhas

(57) ABSTRACT

Techniques are described to provide string customization. In an implementation, a menu document is generated that specifies one or more menu items to be included in a menu that correspond to one or more actions available via code of a module. A string document is generated that specifies one or more strings to represent the one or more menu items in the menu. The menu document and the string document are made available to a client that includes the module to output the menu having the one or more strings to represent the menu items. The one or more strings are selectable to cause a corresponding action to be performed by the module.

16 Claims, 6 Drawing Sheets

(56) References Cited

U.S. PATENT DOCUMENTS

| | | | |
|---|---|---|---|
| 2004/0163046 A1* | 8/2004 | Chu et al. | 715/517 |
| 2005/0240902 A1* | 10/2005 | Bunker et al. | 717/114 |
| 2005/0246726 A1* | 11/2005 | Labrou et al. | 719/328 |
| 2005/0259976 A1* | 11/2005 | Shimoda et al. | 386/125 |
| 2006/0077439 A1 | 4/2006 | Yamamura et al. | |
| 2006/0135196 A1 | 6/2006 | Oh et al. | |
| 2006/0136872 A1 | 6/2006 | Barr et al. | |
| 2006/0143605 A1* | 6/2006 | Cao | 717/174 |
| 2006/0242590 A1 | 10/2006 | Polivy et al. | |
| 2007/0055997 A1 | 3/2007 | Witwer | |
| 2007/0061724 A1 | 3/2007 | Slothouber et al. | |
| 2007/0180386 A1* | 8/2007 | Ballard et al. | 715/744 |
| 2007/0208686 A1* | 9/2007 | Gupta | H04L 67/2823 |

OTHER PUBLICATIONS

"Localized strings", http://www.4js.com/online_documentation/fjs-fgl-2.00.1b-manual-html/User/LocalizedStrings.html, (Feb. 22, 2006), pp. 1-8.

Adobe, "Developer Knowledgebase", Retrieved from: <http://support.adobe.com/devsup.nsf/docs/51508.htm> on Apr. 10, 2007, (Apr. 9, 2005), 4 pages.

* cited by examiner

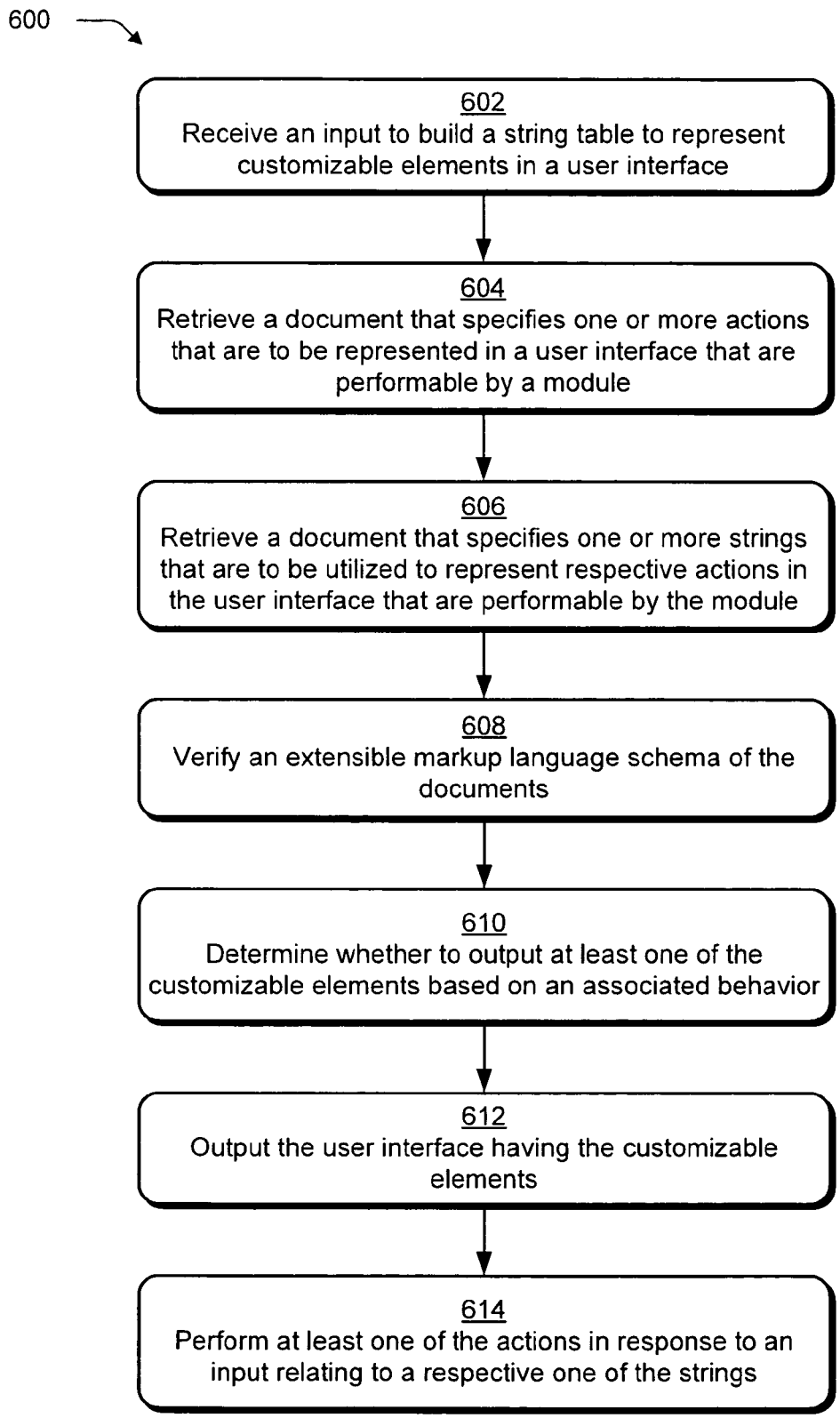

STRING CUSTOMIZATION

BACKGROUND

Set-top boxes and other clients are typically manufactured to include software to operate the client, such as to perform actions that may include changing a channel, causing a television program to be recorded, and so on. This software is typically installed as a disk image on the client by a manufacturer of the client, which is generally configured as a computer file that includes the code and supporting data used by the code to perform the actions.

The client may then be distributed to end consumers, such as household users. In some instances, however, the client is not delivered directly to the end consumers, but rather is delivered to an intermediary. For example, a network operator of a television system may obtain set-top boxes from the manufacturer, which are then subsequently sold or rented to the end consumers. Before the sale or rental of the set-top box to the end consumers, the network operator may wish to customize the set-top box, such as by reconfiguring menus and other elements that are to be displayed in a user interface.

Traditional techniques that were used to manufacture the set-top box (and in particular the use of the disk image), however, may make such customization a daunting task. For example, customization of a traditional set-top box may require an understanding of the underlying code of the set-top box by the network operator to make changes to that code. Further, the implementation of such customization may be resource intensive, both to implement and to make subsequent changes after the client has been deployed by the end consumers.

SUMMARY

Techniques are described to provide string customization. In an implementation, a menu document is generated that specifies one or more menu items to be included in a menu that correspond to one or more actions available via code of a module. A string document is generated that specifies one or more strings to represent the one or more menu items in the menu. The menu document and the string document are made available to a client that includes the module to output the menu having the one or more strings to represent the menu items. The one or more strings are selectable to cause a corresponding action to be performed by the module.

In another implementation, one or more computer-readable media include a module having instructions that are executable on a client to generate a user interface having customizable elements. The user interface is generated by retrieving a document that specifies one or more actions that are performable by the module to be represented in the user interface and retrieving a document that specifies one or more strings that are to be utilized to represent respective actions.

In a further implementation, a client includes a processor and memory configured to maintain a document having one or more strings to be output in a user interface and one or more modules. The one or more modules are executable on the processor to build a string table used to represent customizable elements in a user interface. The string table is built by retrieving a document that specifies one or more strings that are to be utilized to represent respective actions in the user interface that are performable by the module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 6 is a flow diagram depicting a procedure in an exemplary implementation in which a communication module of FIGS. 1 and 2 outputs a user interface having customized strings.

DETAILED DESCRIPTION

Overview

Traditional set-top boxes and other clients had software installed as a disk image by a manufacturer of the client. While this technique was efficient for installation purposes, subsequent modification of the software contained in the disk image was burdensome, such as by a network operator that wished to customize user interfaces output by the client.

Techniques are described to provide string customization. In an implementation, a mechanism is described to provide strings for customizable elements in a user interface. For example, a document may be generated in an extensible markup language (XML) that contains strings that will be output in a user interface, such as menu items in a menu. A module may then reference this document to determine what should be displayed, such as what text to use for menu items. In another example, another document may also be utilized to specify which actions should be included in the user interface, such as by specifying particular menu items to be included in a menu. Therefore, the module may use these documents to create custom menus having custom menu items and/or custom strings to represent the menu items. A variety of other examples are also contemplated, further discussion of which may be found in relation to the following figures.

In the following discussion, an exemplary environment is first described that is operable to perform techniques to customize strings to be output in a user interface. Exemplary procedures are then described that may be employed in the exemplary environment, as well as in other environments. Although these techniques are described as employed within a television environment in the following discussion, it should be readily apparent that these techniques may be incorporated within a variety of environments without departing from the spirit and scope thereof.

Exemplary Environment

Figure 1:
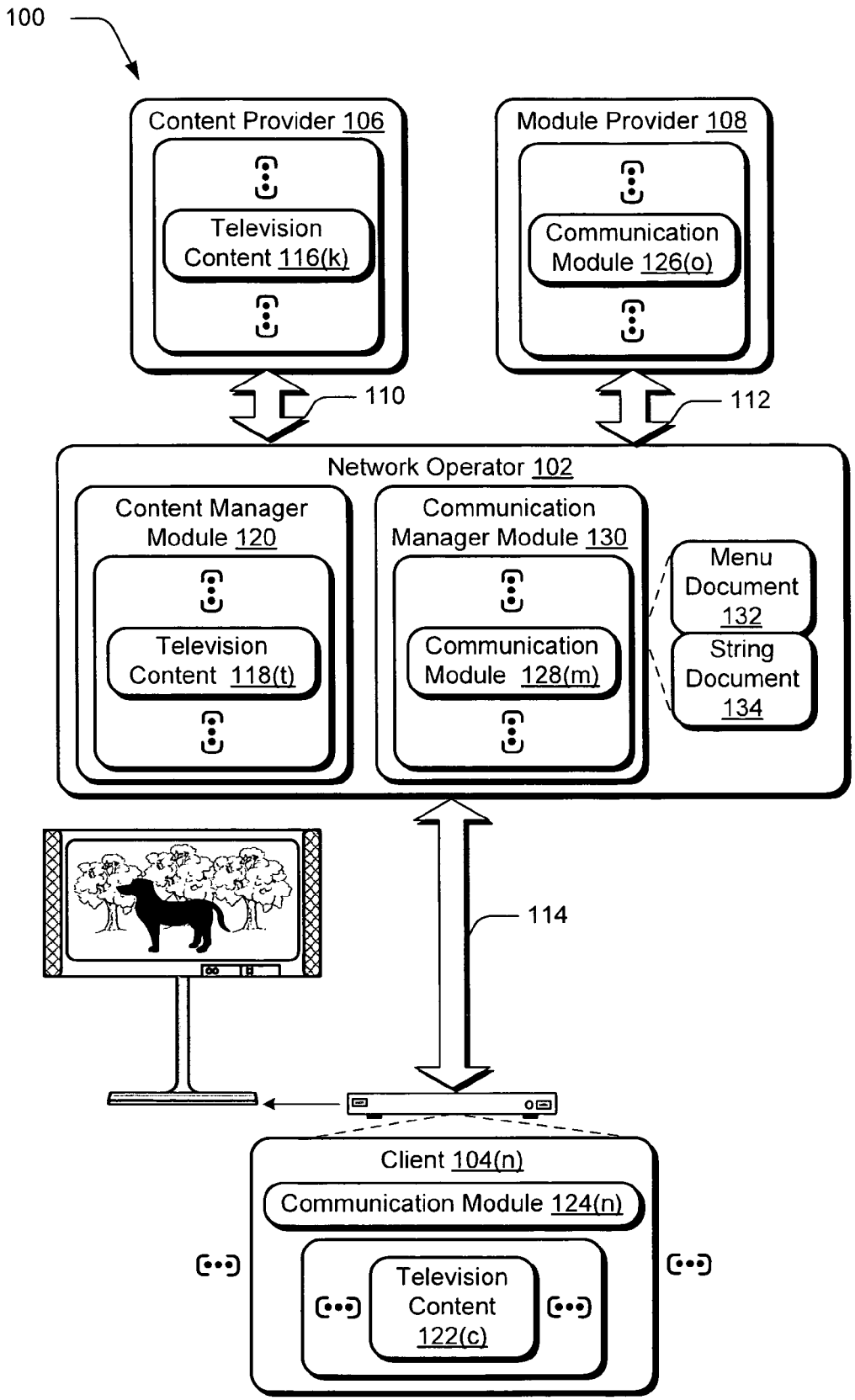
FIG. 1 is an illustration of an environment in an exemplary implementation that is operable to employ techniques to customize strings to be output in a user interface.

FIG. 1 is an illustration of an environment 100 in an exemplary implementation that is operable to customize strings to be output in a user interface. The illustrated environment 100 includes a network operator 102 configured as a head end, one or more clients 104(n) (where "n" can be any integer from one to "N"), a content provider 106 and a module provider 108 that are communicatively coupled, one to another, via network connections 110, 112, 114, respectively. In the following discussion, the network operator 102, the client 104(n), the content provider 106 and the module provider 108 may be representative of one or more entities, and therefore reference may be made to a single entity (e.g., the client 104(n)) or multiple entities (e.g., the network operators 102). Additionally, although a plurality of network connections 110-114 are shown separately, the network connections 110-114 may be representative of network connections achieved using a single network or multiple networks. For example, network connection 114 may be representative of a broadcast network with back channel communication, an Internet Protocol (IP) network, and so on.

The client 104(n) may be configured in a variety of ways. For example, the client 104(n) may be configured as a computer that is capable of communicating over the network connection 114, such as a desktop computer, a mobile station, an entertainment appliance, a set-top box communicatively coupled to a display device as illustrated, a wireless phone, and so forth.

The content provider 106 includes one or more items of television content 116(k), where "k" can be any integer from one to "K". The television content 116(k) may include a variety of data, such as television programming, video-on-demand (VOD) files, and so on. The television content 116(k) is communicated over the network connection 110 to the network operator 102. In the following discussion, television content may also be referred to simply as "content".

Television content 116(k) communicated via the network connection 110 is received by the network operator 102 and may be stored as one or more items of television content 118(t), where "t" can be any integer from "1" to "T". The television content 118(t) may be the same as or different from the television content 116(k) received from the content provider 106. The television content 118(t), for instance, may include additional data for broadcast to the client 104(n), such as electronic program guide (EPG) data. Distribution of the television content 118(t) from the network operator 102 to the client 104(n) may be accommodated in a number of ways, including cable, radio frequency (RF), microwave, digital subscriber line (DSL), satellite, via Internet Protocol (IP) connection, and so forth.

The network operator 102 is illustrated as including a content manager module 120. The content manager module 120 is representative of functionality to configure television content 118(t) for output (e.g., streaming) over the network connection 114 to the client 104(n). The content manager module 120, for instance, may configure television content 116(k) received from the content provider 106 to be suitable for transmission over the network connection 114, such as to "packetize" the content for distribution over the Internet, configuration for a particular broadcast channel, map the television content 116(k) to particular channels, and so on.

The client 104(n), as previously stated, may be configured in a variety of ways to receive the television content 118(t) over the network connection 114. The client 104(n) typically includes hardware and software to transport and decrypt television content 118(t) received from the network operator 102 for rendering by the illustrated display device. Although a display device is shown, a variety of other output devices are also contemplated, such as speakers.

The client 104(n) may also include digital video recorder (DVR) functionality. For instance, the client 104(n) may include memory to record television content 118(t) as television content 122(c) (where "c" can be any integer from one to "C") received via the network connection 114 for output to and rendering by the display device, further discussion of the memory may be found in relation to FIG. 2.

Thus, in the environment 100 of FIG. 1, the content provider 106 may broadcast the television content 116(k) over a network connection 110 to a multiplicity of network operators, an example of which is illustrated as network operator 102. The network operator 102 may then stream the television content 118(t) over a network connection 114 to a multitude of clients, an example of which is illustrated as client 104(n). The client 104(n) may then store the television content 118(t) in memory as television content 122(c) and/or render the television content 118(t) immediately for output as it is received, such as when the client 104(n) is configured to include digital video recorder (DVR) functionality.

The client 104(n) includes a communication module 124(n) that is executable on the client 104(n) to perform one or more actions, such as to control content playback on the client 104(n). For example, the communication module 124(n) may perform one or more "command modes", i.e., "trick modes", to tune to a particular channel, order pay-per-view content, control output of video-don-demand, and so on. The command modes, for instance, may provide non-linear playback of the content 122(c) (i.e., time shift the playback of the content 122(c)) such as pause, rewind, fast forward, slow motion playback, and the like. A variety of other actions may also be performed by the communication module, further discussion of which may be found in relation to the following figure.

The communication module 124(n) may be obtained by the client 104(n) in a variety of ways. For example, the module provider 108 is illustrated as including one or more communication modules 126(o) (where "o" can be any integer from one to "O"). The module provider 108 may be implemented in a variety of ways, such as by a manufacturer of the client 104(n), a third-party service that provides the communication module 126(o) as a platform to abstract underlying actions available via the client 104(n), and so on.

In the illustrated environment 100 of FIG. 1, the communication module 126(o) is provided via a network connection 112 to the network operator 102, which is illustrated as communication module 128(m) (where "m" can be any integer from one to "M"). The network operator 102 is also illustrated as including a communication manager module 130 that is representative of functionality to customize execution of the communication module 128(m). The communication manager module 130, for instance, may generate one or more user interfaces to customize elements of a user interface, further discussion of which may be found in relation to FIGS. 3 and 4.

Through interaction with the user interface, a technician may generate documents that exist separately from the communication module 128(m) which may be used by the communication module 128(m) to provide custom elements. For example, the communication manager module 130 may be used to generate a menu document 132 which specifies what is to be included in a menu, which may be selected from underlying functionality of the communication module 128(m). The communication manager module 130 may also be used to generate a string document 134 to specify strings that are to be used to represent the selected functionality specified in the menu document 132.

The communication module 128(*m*), menu document 132, and string document 134 may then be provided to the client 104(*n*) to generate a custom user interface. For example, the menu document 132 and the string document 134 may be provided with the client 104(*n*) when sold or rented to an end user. Further, subsequent menu documents 132 and/or string documents 134 may be provided as an update to customize the user interface in the future, such as in response to an advertising campaign to included a branded user interface, in response to added functionality, and so on. Thus, by separating the specification of which items to include in a user interface and how to represent those items, changes may be made to the user interface without manually interacting with the underlying code of the communication module 128(*m*), further discussion of which may be found in relation to the following figure.

It should be noted that one or more of the entities shown in FIG. 1 may be further divided (e.g., the network operator 102 may be implemented by a plurality of servers in a distributed computing system), combined (e.g., the network operator 102 may incorporate functionality of the module provider 108 to generate the communication module 128(*m*)), and so on and thus the environment 100 of FIG. 1 is illustrative of one of a plurality of different environments that may employ the described techniques.

Figure 2:
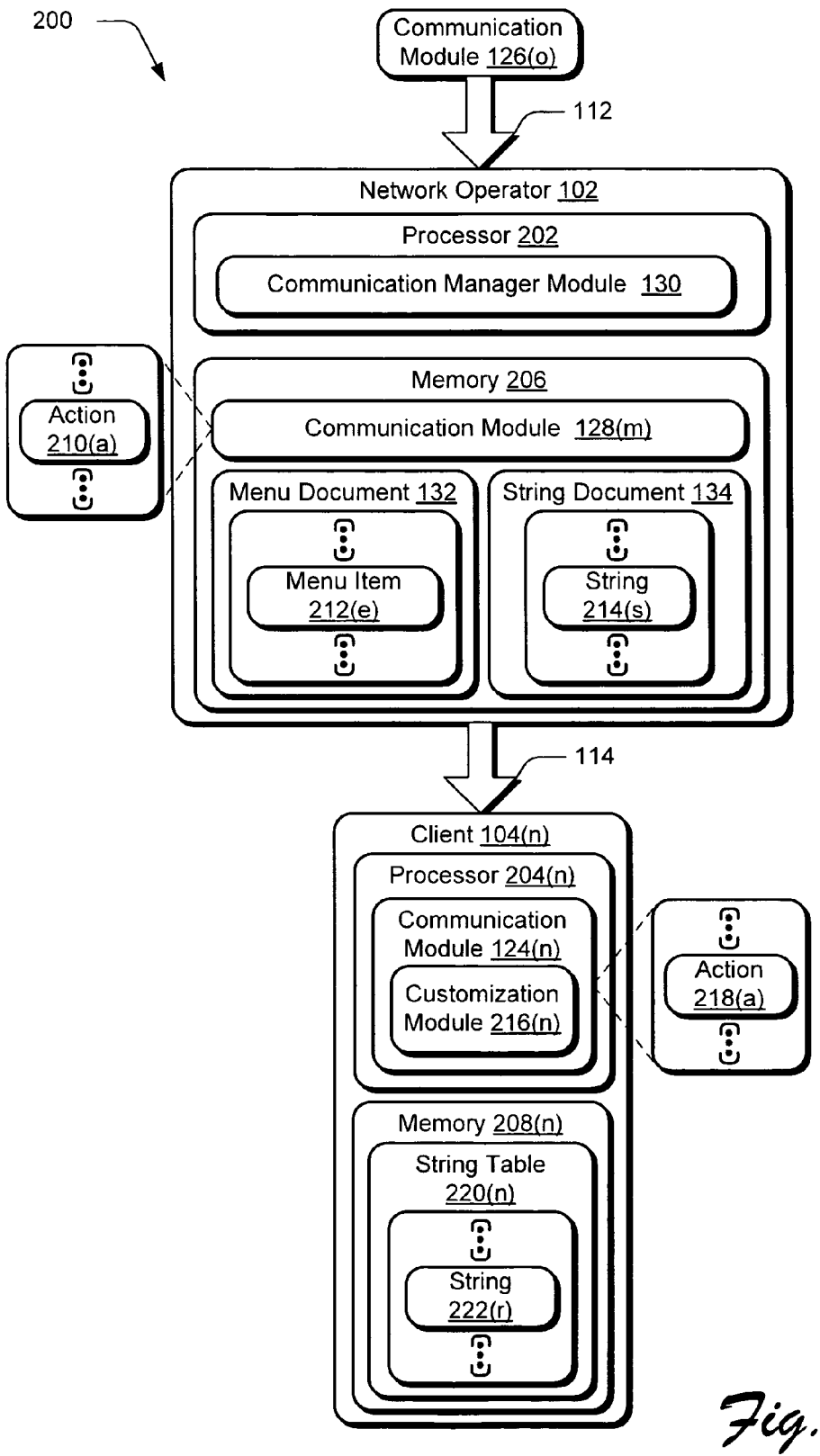
FIG. 2 is an illustration of a system in an exemplary implementation showing a network operator and a client of FIG. 1 in greater detail.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware or a combination thereof. In the case of a software implementation, for instance, the module, functionality, or logic represents program code that performs specified tasks when executed on a processor (e.g., CPU or CPUs). The program code can be stored in one or more computer-readable memory devices, examples of which are shown in FIG. 2. The features of the techniques to customize strings are platform-independent, meaning that the techniques may be implemented on a variety of commercial computing platforms having a variety of processors.

FIG. 2 depicts a system 200 in an exemplary implementation showing the network operator 102 and the client 104(*n*) of FIG. 1 in greater detail. The network operator 102 and the client 104(*n*) are both illustrated as computers having respective processors 202, 204(*n*) and memory 206, 208(*n*). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 206, 208(*n*) is shown, respectively, for the network operator 102 and the client 104(*n*), a wide variety of types and combinations of memory may be employed, such as random access memory (RAM), hard disk memory, removable medium memory, and other types of computer-readable media.

The network operator 102 is illustrated as executing the communication manager module 130 on the processor 202, which is also storable in memory 206. As previously stated, the communication manager module 130 is representative of functionality to customize user interfaces output by the communication module 128(*m*). For example, the communication module 128(*m*) may include code that is executable to perform one or more actions 210(*a*), where "a" can be any integer from one to "A". These actions 210(*a*), for instance, may be performed through execution of code to be used by the client 104(*n*) provided through use of a disk image. Although illustrated separately, the communication manager module 130, and consequently the functionality represented by the communication manager module 130 may be incorporated within the communication module 128(*m*).

Figure 3:
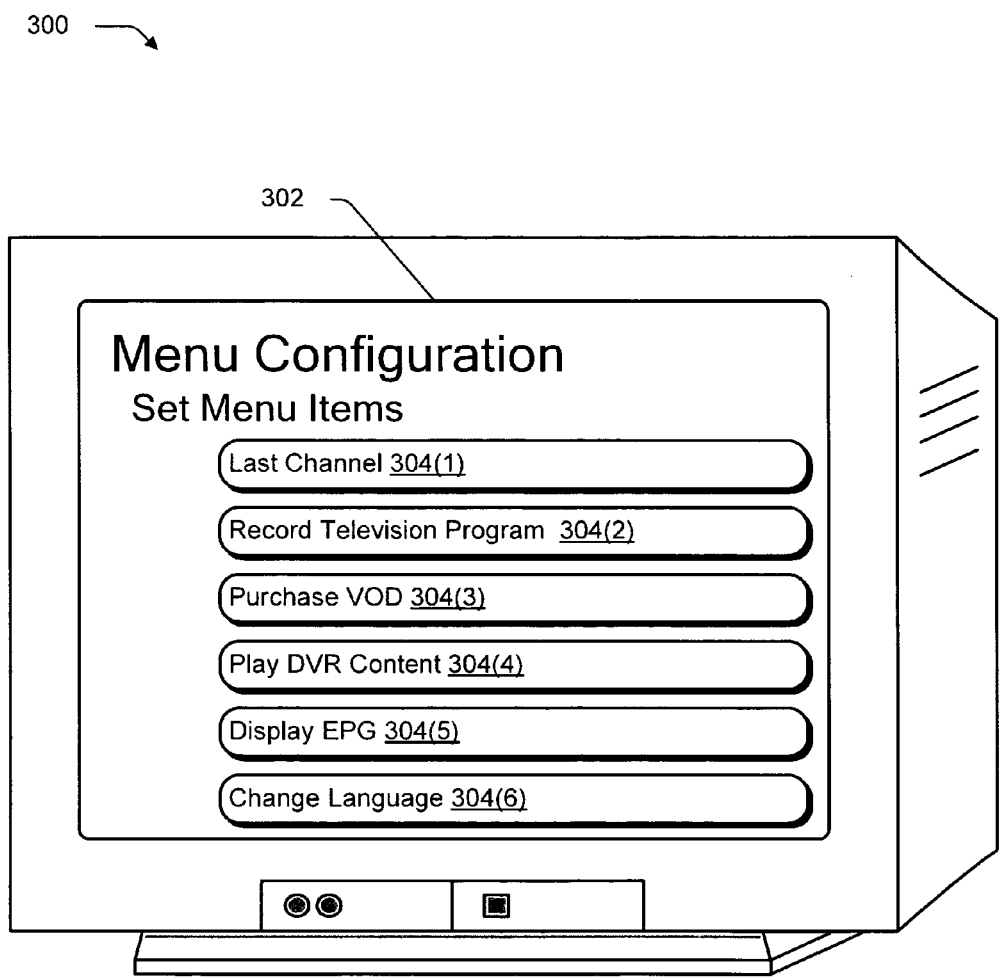
FIG. 3 depicts an exemplary implementation of a user interface that is output to expose and customize one or more actions that are available from a communication module of FIGS. 1 and 2.

The communication module 128(*m*) may be customized in a variety of ways through execution of the communication manager module 130. For example, the communication manager module 130 may be used to expose the actions 210(*a*) which are available from the communication module 128(*m*), an example of which is shown in FIG. 3. One or more menu items 212(*e*) that reference these actions may then be stored in the menu document 132, such as through use of an extensible markup language (XML). The menu items 212(*e*) may be configured in a variety of ways, such as a link menu item (e.g., a menu item having a uniform resource locator (URL) to link to a resource), a key menu item (e.g., a menu item that corresponding to a key press), a media menu item (e.g., a menu item that when selected causes output of a media item), and so on.

A variety of techniques may be used to generate the menu document 132. For example, the menu document 132 may be generated by manually writing the menu document 132 in XML according to a predetermined schema, through interaction with a user interface, and so on, examples of which may be found in relation to the following figure.

FIG. 3 depicts an exemplary implementation 300 of a user interface 302 that is output to expose and customize one or more actions 210(*a*) that are available from the communication module 128(*m*). The user interface 302 is an example of a "menu selection" user interface which may be output to select menu items 304(1)-304(6) that may be included in a menu. The menu items 304(1)-304(6) correspond to actions 210(*a*) available from the communication module 128(*m*). Thus, in this example the technician may select from the menu items 304(1)-304(6) to customize which actions 210(*a*) are to be represented in a menu, which may then be stored as one or more menu items 212(*e*) in the menu document 132.

Returning now to FIG. 2, the communication manager module 130 may also be used to specify how the menu items 212(*e*) specified in the menu document 132 are to be displayed in a menu. For example, the communication manager module 130 may be used to generate the string document 134 to include one or more strings 214(*s*), where "s" can be any integer from one to "S".

The strings 214(*s*) may then be used to represent the menu items 212(*e*) referenced in the menu document 132 for a variety of other purposes, such as to provide branding in a user interface. The string document 134, like the menu document 132, may be generated in a variety of ways, such as by manually writing the string document 134 in XML according to a predetermined schema or through interaction with a user interface, an example of which may be found in relation to the following figure.

Figure 4:
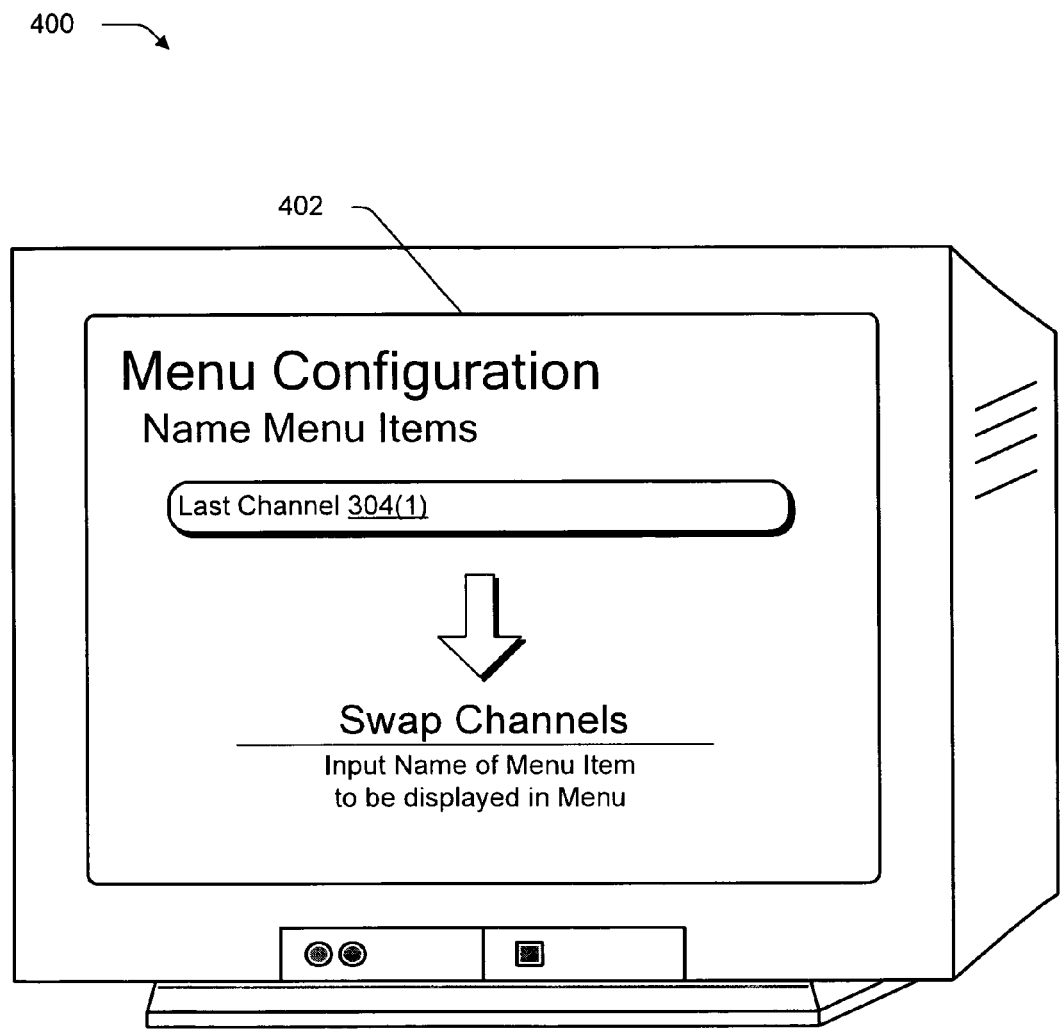
FIG. 4 depicts an exemplary implementation of a user interface that is output to input one or more strings to customize a user interface output by a communication module of FIGS. 1 and 2.

FIG. 4 depicts an exemplary implementation 400 of a user interface 402 that is output to input one or more strings to customize a user interface output by the communication module 128(*m*) of FIG. 2. In this example, the user interface 402 is output in response to selection of the menu item 304(1) from the user interface 302 of FIG. 3, which is illustrated as "Last Channel". The technician is then given an opportunity to specify a name of the menu item to be displayed in the menu, which is illustrated a "Swap Channels". This string "swap channels" may then be stored in the string document 134 and used to represent the menu item 304(1) "last channel" in a menu described by the menu document 132. As previously described, although customization of a menu has been described, a variety of elements in a user interface may be customized using the string document 134.

Returning again to FIG. 2, the client 104(n) is illustrated as executing the communication module 124(n) on the processor 204(n), which is also storable in memory 208(n). The communication module 124(n) is illustrated as including a customization module 216(n) that is representative of functionality employable by the communication module 124(n) to customize elements of a user interface.

For example, the customization module 216(n) may be executed to use the menu document 132 and the string document 134 to build a string table 220(n) having one or more strings 220(r) (where "r" can be any integer from one to "R") that are to be output in the user interface. For example, the menu items 212(e) may each provide an identifier which is used as a lookup in the string table 220(n) to determine which string to output for the menu item 212(e). Thus, the customization module 216(n) is not "aware" of what is included in the string 222(r), thereby separating the data used for the representation from the underlying functionality, e.g., the string from the action.

In an implementation, the communication module 124(n) is responsible for how the string 222(r) is displayed (e.g., formatting and appearance) while the string 222(r) of the string table 220(n) specifies "what" is displayed. A variety of other embodiments are also contemplated, and thus although customization of a menu has been described, it should be readily apparent that a wide variety of custom elements in a user interface that are provided via strings are also contemplated.

Exemplary Procedures

The following discussion describes customization techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 5:
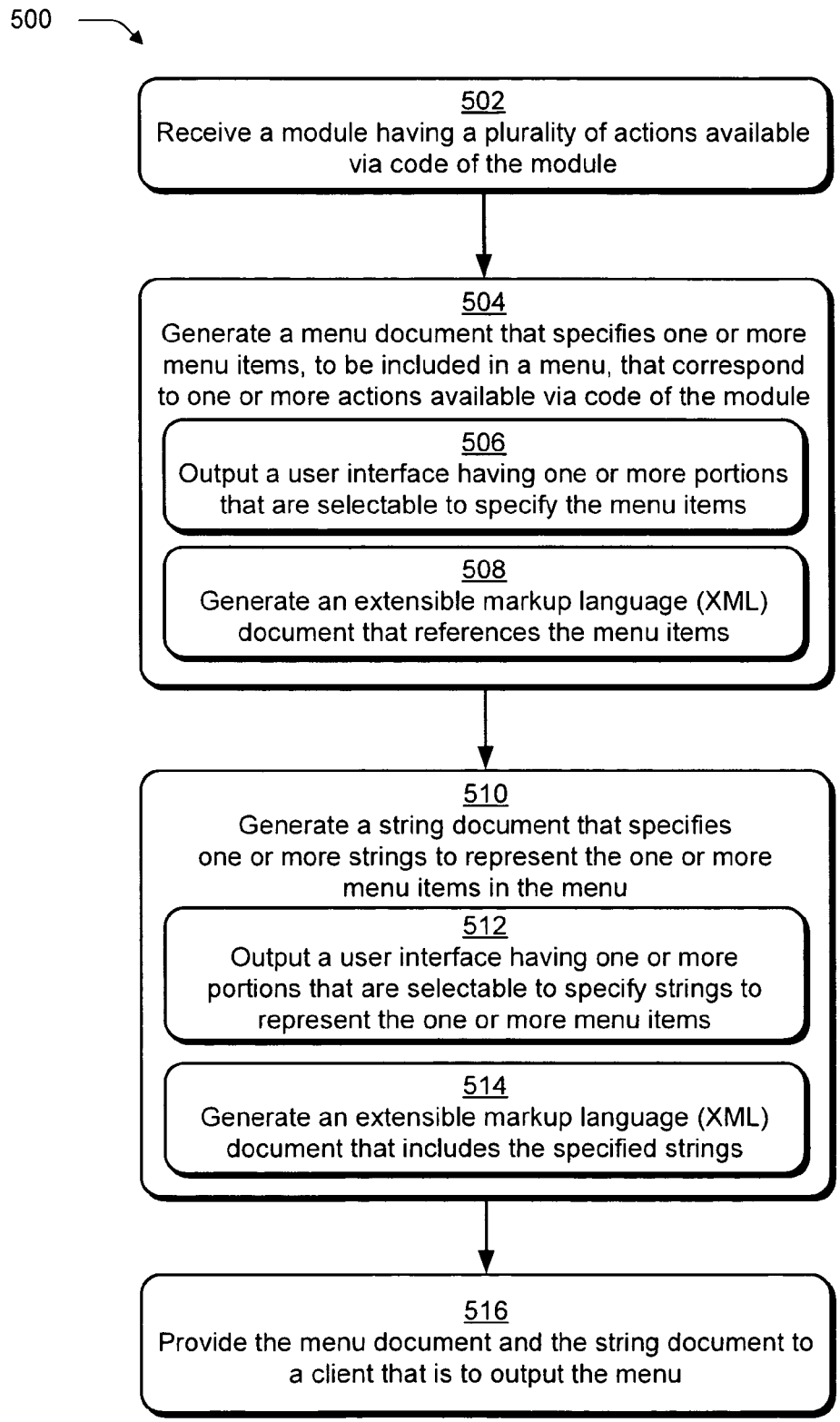
FIG. 5 is a flow diagram depicting a procedure in an exemplary implementation in which one or more documents are generated for use by a module to customize elements of a user interface output by the module.

FIG. 5 depicts a procedure 500 in an exemplary implementation in which documents are generated for use by a module to customize elements of a user interface output by the module. A module is received having a plurality of actions that are available via code of the module (block 502). For example, the communication module 124(n) may be received by the network operator 102 from the client 104(n) obtained for resale or rental to an end user. In another example, the communication module 126(o) may be received from a module 108 over a network connection 112, such as a copy of the communication module 124(n) to be deployed on the client 104(n). A variety of other examples are also contemplated.

A menu document is generated that specifies one or more menu items, to be included in a menu, that correspond to one or more actions available via code of the module (block 504). For example, a user interface 302 may be output having one or more portions that are selectable to specify the menu items 304(1)-304(6) (block 506). An extensible markup language document is then generated that references the menu items (block 508), such as the menu document 132 which was described in relation to FIG. 2. In another example, the technician may manually write the menu document 132 following an XML schema.

A string document is generated that specifies one or more strings to represent the one or more menu items in the menu (block 510). For example, a user interface 402 may be output having one or more portions that are selectable to specify strings to represent the one or more menu items (block 512). An extensible markup language document is then generated that includes the specified strings (block 514), such as the string document 134 which was described in relation to FIG. 4. In another example, the technician may manually write the string document 134 following an XML schema.

The menu document and the string document are provided to a client that is to output the menu (block 516), such as stored on the client 104(n) before distribution, communicated over the network connection 114 as an update, and so on. In this way, the network operator 102 may customize a user interface in an efficient and intuitive manner without delving into underlying code of the communication module 124(n). The communication module 124(n) may then output a customized user interface through use of the documents, further discussion of which may be found in relation to the following figure.

FIG. 6 depicts a procedure 600 in an exemplary implementation in which the communication module 124(n) of FIGS. 1 and 2 outputs a user interface having customized strings. An input is received to build a string table to represent customizable elements in a user interface (block 602). The client 104(n), for instance, may be initiated (e.g., booted), switched from one language represent by a current string table to another language, monitor a change in a string to be output in a user interface (e.g., a notification that an update is available), and so on.

A document is recited that specifies one or more actions that are to be represented in a user interface that are performable by a module (block 602). Continuing with the previous example, the customization module 216(n) may retrieve the menu document 132 having one or more menu items 212(e), such as over a network connection 114, locally from memory 208(n) of the client 104(n), and so on. The menu items 212(e) correspond to one or more actions 218(a) available via underlying code of the communication module 124(n)

A document is also retrieved that specifies one or more strings that are to be utilized to represent respective actions in the user interface that are performable by the module (block 606). As before, the customization module 216(n) may retrieve the string document 134 via the network connection 114 (e.g., as an update), locally from memory 208(n) of the client 104(n) (e.g., from a removable computer-readable medium), and so on.

An extensible markup language (XML) schema of the documents is verified (block 608). For example, the customization module 216(n) may be aware of the XML schema that is to be employed by the respective documents (e.g., the menu document 132 and/or the string document 134) and verify that the XML employed by the documents complies with the expected XML schema. If not, the customization module 216(n) may stop the procedure 600, notify a user that the customization failed and revert back to use of a previous string table 220(n), and so on.

A determination is made as to whether at least one of the customizable elements is to be output based on an associated behavior (block 610). The network operator 102, for instance, may configure the menu document 132 and or the string document 134 for use by a wide range of clients having different functionality. Therefore, the network operator, through execution of the communication manager module 130, may assign behaviors to particular menu items 212(e). For example, the network operator 102 may provide a first set of set-top boxes that have DVR functionality (e.g., a hard disk drive to record television content 122(c)) and a second set of set-top boxes that do not. Accordingly, the network operator 102 may associate a behavior with menu items related to a DVR such that when a hard disk drive is not available, menu items and their custom strings that relate to DVR actions are not included in a menu. A variety of other behaviors are also contemplated that relate to actions 218(a) available to be performed at the client 104(n).

The user interface is output having the customizable elements (block 612). The customization module 216(n), for instance, may build the string table 220(n) using strings 214(s) contained in a string document 134). The customization module 216(n) may also parse the menu document 132 to determine which menu items 212(e) are to be included in a menu. The customization module 216(n) may then use the string table 220(n) to locate one or more strings 220(r) that are to be used to represent the menu items 212(e) in the menu, such as through use of an identifier of the menu item as an index in the string table 220(n). A variety of other examples are also contemplated.

At least one of the actions is performed in response to an input relating to a respective one of the strings (block 614). Continuing with the example of FIG. 4, the text "swap channels" may be selected from a menu, which corresponds to the menu item 304(1) "last channel". Therefore, selection of the "swap channels" string in the menu may cause the client 104(n), and more particularly the communication module 124(n) of the client 104(n), to tune to a previous television channel that was output by the client 104(n). Although use of a string to implement an action was described, it should be apparent that the strings 220(r) of the string table 220(n) built from the string document 134 may also be used for other purposes, such as for branding a user interface (e.g., a name of the network operator 102), outputting a user's name of the client 104(n), and so on.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. One or more computer-readable hardware memory devices comprising a module having instructions that are executable on a client to perform operations comprising:
retrieving a menu document that specifies one or more menu items corresponding with one or more actions that are performable by the module to be represented in the user interface, wherein at least one action is associated with a behavior that specifies whether the at least one action is to be represented in the user interface;
retrieving a separate string document that specifies one or more strings that are to be utilized to represent respective said actions, wherein the string document is configurable to allow a user to specify a user-defined, customized name, representing an action that is performable by the module, to be displayed; and
generating a user interface having customizable elements comprising the one or more actions matched with the one or more strings, wherein a determination to output at least one customizable element is based on an associated behavior of a device that is to display the user interface,
wherein the menu document and string document are each generated by a network operator that streams television content to the client.

2. One or more computer-readable hardware memory devices as described in claim 1, wherein the retrieving of the menu document and the retrieving of the string document are performed via a network connection.

3. One or more computer-readable hardware memory devices as described in claim 1, wherein the retrieving of the menu document and the retrieving of the string document are performed from memory of the client.

4. One or more computer-readable hardware memory devices as described in claim 1, wherein the menu document and the string document use extensible markup language (XML).

5. One or more computer-readable hardware memory devices as described in claim 4, wherein the instructions are further executable to verify an extensible markup language (XML) schema employed by the menu document or the string document.

6. One or more computer-readable hardware memory devices as described in claim 1, wherein the module is stored as code in the client.

7. A computer-implemented method comprising:
generating a user interface having customizable elements by at least:
retrieving, using a computing device, a menu document that specifies one or more menu items corresponding with one or more actions that are performable, wherein at least one action is associated with a behavior that specifies whether the at least one action is to be represented in the user interface;
retrieving, using the computing device, a separate string document that specifies one or more strings that are to be utilized to represent respective said actions, wherein the string document is configurable to allow a user to specify a user-defined, customized name, representing an action to be displayed; and
determining whether to output at least one of the customizable elements based on an associated behavior of the computing device,
wherein the menu document and string document are generated by a network operator that streams television content to the client.

8. The computer-implemented method of claim 7, wherein the retrieving of the menu document and the retrieving of the string document are performed via a network connection.

9. The computer-implemented method of claim 7, wherein the retrieving of the menu document and the retrieving of the string document are performed from memory of an associated client.

10. The computer-implemented method of claim 7, wherein the menu document and the string document use extensible markup language (XML).

11. The computer-implemented method of claim 10, further comprising verifying an extensible markup language (XML) schema employed by the menu document or the string document.

12. A system comprising:
one or more processors;
one or more computer-readable storage memories embodying computer-readable instructions which, when executed under the influence of the one or more processors, implement a method comprising:
generating a user interface having customizable elements by at least:

retrieving, using a computing device, a menu document that specifies one or more menu items corresponding with one or more actions that are performable, wherein at least one action is associated with a behavior that specifies whether the at least one action is to be represented in the user interface;

retrieving, using the computing device, a separate string document that specifies one or more strings that are to be utilized to represent respective said actions, wherein the string document is configurable to allow a user to specify a user-defined, customized name, representing an action to be displayed; and determining whether to output at least one of the customizable elements based on an associated behavior of the computing device, wherein the menu document and string document are generated by a network operator that streams television content to the client.

13. The system of claim 12, wherein the retrieving of the menu document and the retrieving of the string document are performed via a network connection.

14. The system of claim 12, wherein the retrieving of the menu document and the retrieving of the string document are performed from memory of an associated client.

15. The system of claim 12, wherein the menu document and the string document use extensible markup language (XML).

16. The system of claim 15, further comprising verifying an extensible markup language (XML) schema employed by the menu document or the string document.

* * * * *